United States Patent [19]
Berilla et al.

[11] 3,905,129
[45] Sept. 16, 1975

[54] TRUE DIMENSIONING AND TOLERANCING DEMONSTRATOR

[76] Inventors: Thomas Berilla, 2615 Highbee Rd., Md. 20783; James B. Long, 8810 Braeside Dr., Lanham, Md. 20810; Clyde D. Martin, 1754 Lanier Pl., N.W., Washington, D.C. 20019

[22] Filed: May 24, 1974

[21] Appl. No.: 473,015

[52] U.S. Cl. .......................................... 35/13; 35/50
[51] Int. Cl. .......................................... G09b 25/02
[58] Field of Search ........... 35/10, 13, 22 A, 49, 50, 35/73; 33/143 H, 174 G, 174 H, 174 TB

[56] References Cited
UNITED STATES PATENTS

| | | | |
|---|---|---|---|
| 1,877,643 | 9/1932 | Brown | 35/22 A |
| 2,585,521 | 2/1952 | Wandrus | 33/174 G |
| 2,984,013 | 5/1961 | Golner | 33/143 H |
| 3,427,731 | 2/1969 | Debolt | 35/13 |

FOREIGN PATENTS OR APPLICATIONS

| | | | |
|---|---|---|---|
| 370,080 | 4/1932 | United Kingdom | 25/22 A |

*Primary Examiner*—Wm. H. Grieb
*Attorney, Agent, or Firm*—John R. Utermohle; Thomas O. Maser

[57] ABSTRACT

A demonstration device to be used in teaching the principles of maximum material condition, least material condition and true position as they are applied in the drafting technique commonly known as "True Dimensioning and Tolerancing." It has particular value in aiding in the visualization of these principles as they apply to the interconnectability and interchangeability of mating parts. The technical terms contained herein are defined in the American National Standard Institute Standard Y14.5 for Dimensioning and Tolerancing Engineering Drawings.

4 Claims, 9 Drawing Figures

TRUE DIMENSIONING AND TOLERANCING DEMONSTRATOR

BACKGROUND OF THE INVENTION

This invention relates generally to the teaching field, and more particularly to tools which may be used by an instructor to aid a student in the visualizing of a concept to be learned, in this case certain fundamental concepts of tolerancing from true position.

Tolerance gauges of the "go" - "no go" type are old in the art. See for example, the U.S. Pat. No. 2,585,521 to Wandrus. The type of gauge embodied therein is limited in that it verifies only that a form is less than a specified maximum, and is inadequate for specifying any necessary fitting relationship of holes, pins and similar characteristic features within the form. Other gauges, such as that described in U.S. Pat. No. 2,984,013 to Golner, can be used to verify that a given feature size is within maximum and minimum dimensional limits, but again does not specify or illustrate a fitting relationship of various parts of the measured object. These and similar devices, while providing an adequate test for a particular feature dimension, are inadequate to show a necessary fitting relationship of interchangeable parts.

Since the beginning of the use of interchangeable parts, it has been found to be economically necessary to allow for certain tolerance, or looseness of fit, in product designs. The concept of perfect fit was no longer applicable to a situation where a part could be required to mate with any of an indefinite number of other parts. Along with this problem arose the related problem of how to adequately describe the allowable tolerances on an engineering drawing. A recent attempt to solve this problem, a drafting standard called Y14.5 adopted by the United States of America Standards Institute, has encountered much resistance by the manufacturing community. It is believed that much of the resistance is due to the difficulty experienced by many draftsmen in attempting to visualize precisely how the dimensions of one part relates to the dimensions on a second part to provide a proper mating relationship.

SUMMARY OF THE INVENTION

Accordingly, it is desirable to have a teaching tool which will aid a draftsman in visualizing certain basic concepts, thereby imparting to him a better understanding of the proper dimensioning technique and how adherence to this technique insures proper mating of the finished parts.

It is also an object to provide a teaching tool to aid in the teaching of true dimensioning and tolerancing.

It is an object of this invention to provide a tool for aiding in the teaching and visualization of the concepts of least material condition, maximum material condition, and true position.

It is a further object of this invention to provide an apparatus for demonstrating the interconnectability, for the purpose of obtaining economical interchangeability, of parts having dimensions within the limits of least material condition and maximum material condition.

Such an apparatus may include at least three substantially similarly shaped embodiments of a first member, a first of the embodiments having the dimensions of maximum material condition, a second of the embodiments having the dimensions of least material condition, and the third of the embodiments having some arbitrary dimensions between maximum material condition and least material condition; and at least three substantially similar shaped embodiments of a second member designed to mate with the first member, a first of the embodiments having the dimensions of maximum material condition, a second of the embodiments having the dimensions of least material condition, and the third of the embodiments having some arbitrary dimensions between maximum material condition and least material condition.

Other objectives and advantages of a teaching aid embodying the invention will become apparent from the detailed description herein below, when considered together with the accompanying drawings.

DESCRIPTION OF THE PREFERRRED EMBODIMENT

Figure 1:
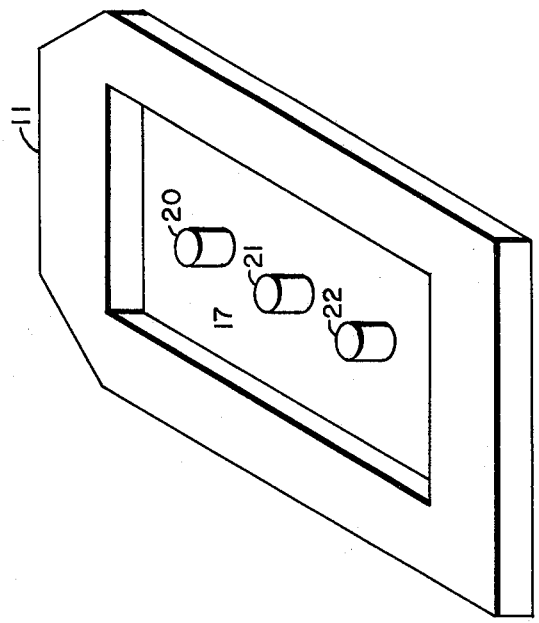
FIG. 1 is a three dimensional view of a plate and frame constituting a preferred embodiment of the invention.
Figure 1:
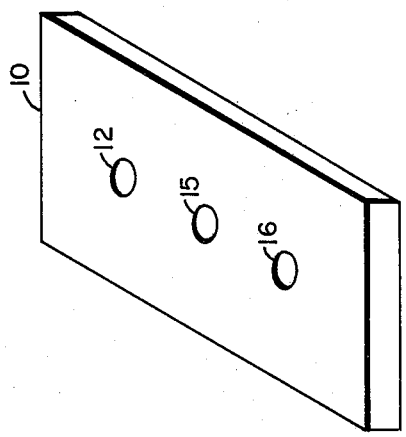

Referring to FIG. 1, a preferred embodiment of the invention described herein includes a plurality of plates, each of which look substantially like the plate 10, and a plurality of frames, each of which look substantially like the frame 11. Each of the plates differs in a small but significant way from each of the other plates, and each of the frames differs in a small but significant way from each of the other frames. The manner in which the plates and frames differ from one another is further described herein below. Each plate 10 includes a hold 12, a hole 15, and a hole 16. The number of holes is not to be considered as a limitation, but it is contemplated that a practical embodiment will include at least two holes. The three-hole embodiment is considered optimum for reasons which are explained below. Each frame 11 includes a recessed portion 17 having therein a plurality of pins equal in number to the number of holes in the plate 10; in the embodiment shown, there are three pins 20, 21, and 22. The plate 10 is configured to fit within the recessed portion 17 of the frame 11 such that hole 12 mates with pin 20, hole 15 mates with pin 21, and hole 16 mates with pin 22.

Figure 2:
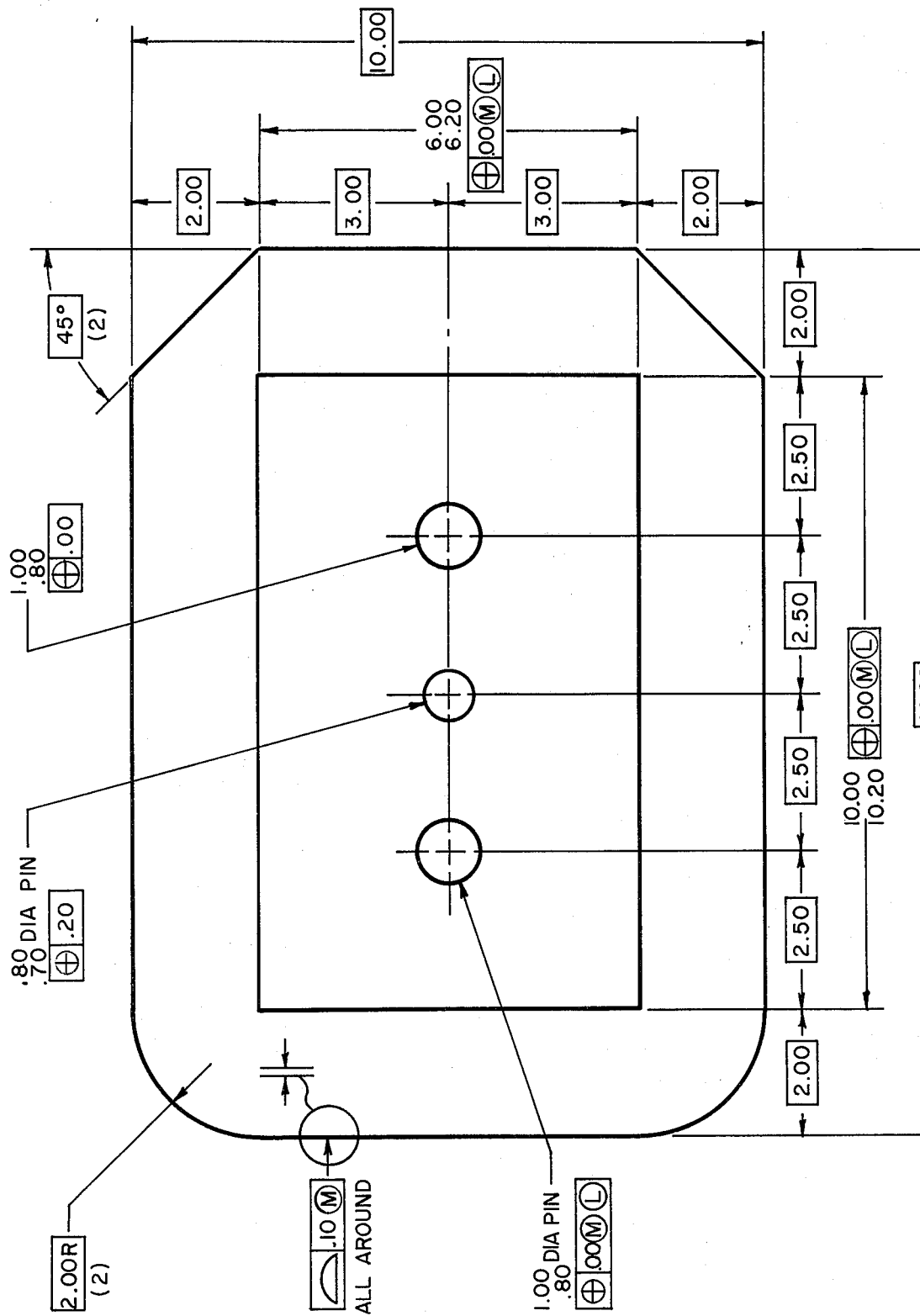
FIG. 2 is a properly dimensioned engineering drawing of a frame, the dimensioning being in accordance with the principles of true dimensioning and tolerancing.
Figure 3:
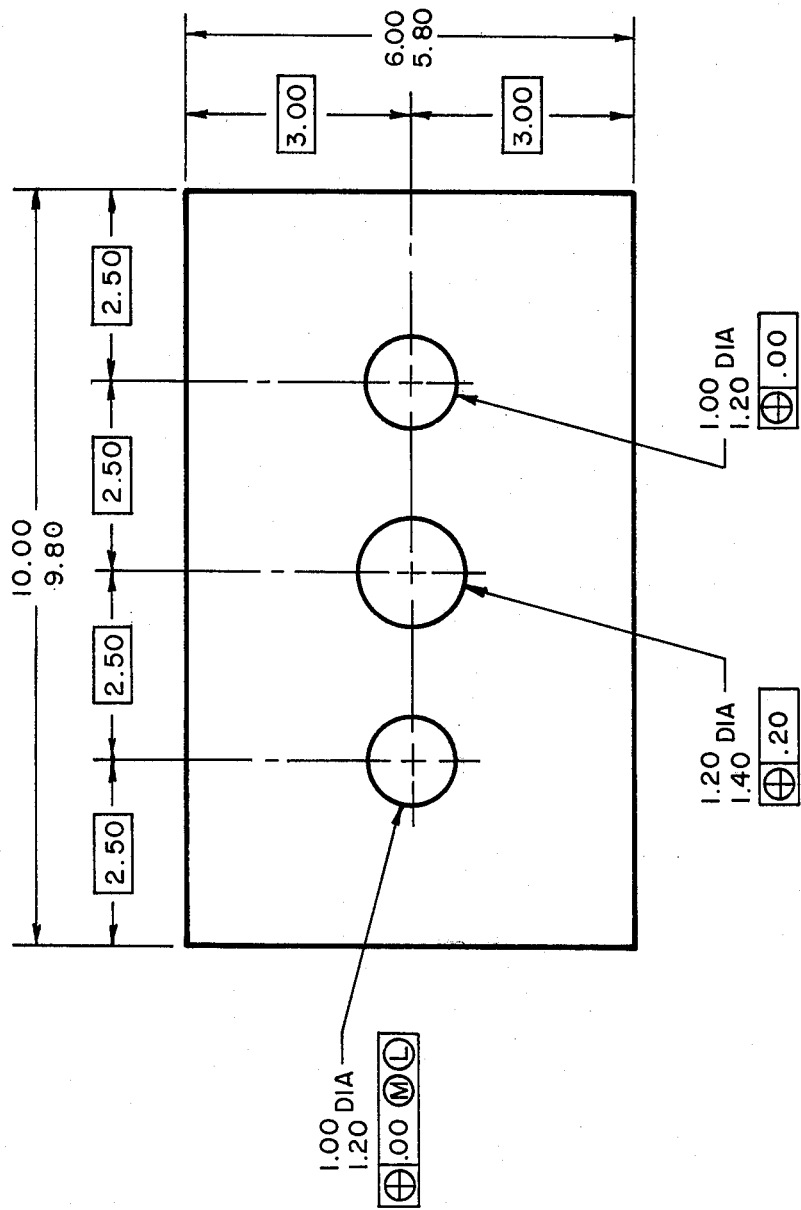
FIG. 3 is a properly dimensioned engineering drawing of a plate, the dimensioning being in accordance with the principles of true dimensioning and tolerancing.

Since the purpose of the invention described herein is to teach a technique of dimensioning engineering drawings, it is likely that an instructor would use the apparatus in conjunction with a set of properly dimensioned engineering drawings. A set of such drawings for the particular embodiment described herein would include a frame drawing as shown in FIG. 2, and a plate drawing as shown in FIG. 3. Each of the drawings in the FIGS. 2 and 3 is properly dimensioned in accordance with the principles of true dimensioning and tolerancing, the dimensioning technique to be taught with the aid of this apparatus. The size of the frames and plates is in no way a limitation in this invention, and the specific dimensions used within the FIGS. 2 and 3 are illustrative only. Nor is a specific shape an essential limitation; it is only necessary that the pieces be required to fit together in a manner which illustrates the principles of true position, maximum material condition and least material condition. The three pins are included in the preferred embodiment to illustrate the various ways of defining positional tolerances of circular features.

Figure 4:
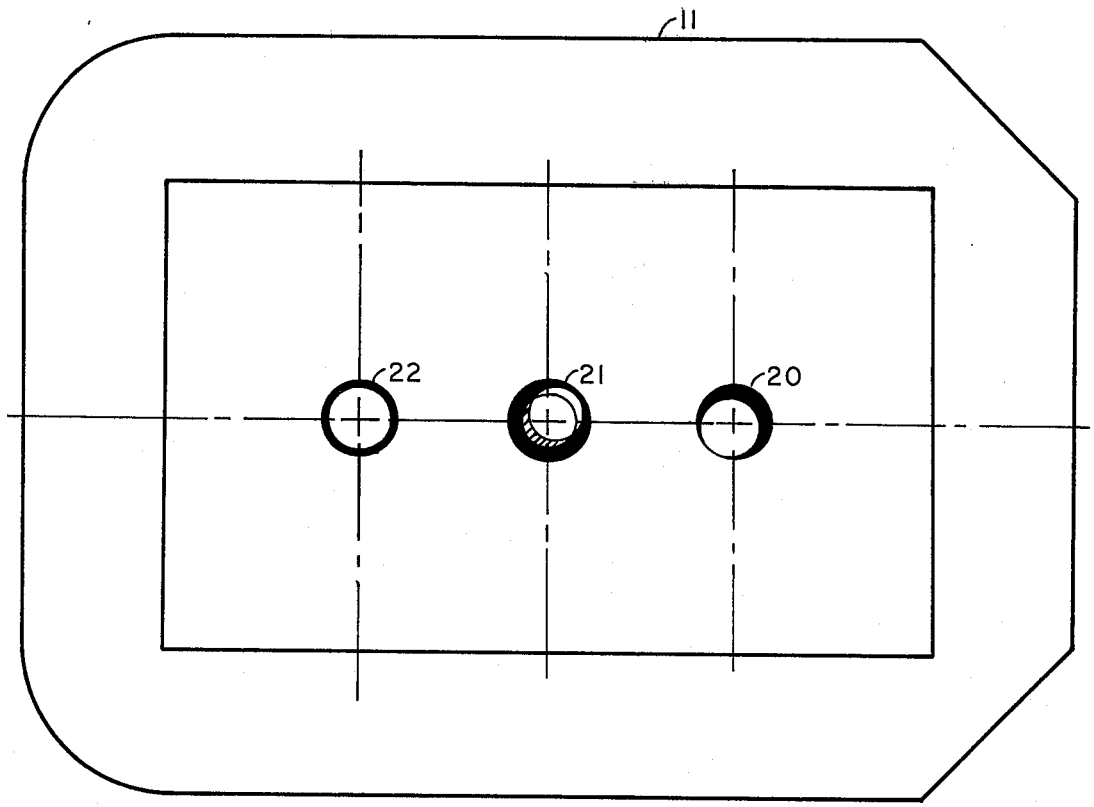
FIG. 4 is a top view of a frame having the dimensions of maximum material condition in accordance with the drawing of FIG. 2.

FIG. 4 shows a frame 11 cut to the dimensions of maximum material condition in accordance with the drawing of FIG. 2. This frame, and the other pieces described herein below, may be constructed from any suitable material such as metal, plastic or wood. For maximum impact, the heavy shaded lines would be included on the frame to indicate those portions which could be removed and still be within allowable tolerances. Each of the pins 20, 21 and 22 must be centered on its true position at maximum material condition, but the shading of pins 20 and 21 might desirably be offset to indicate the maximum positional deviation which still meets the specification of FIG. 2.

Figure 5:
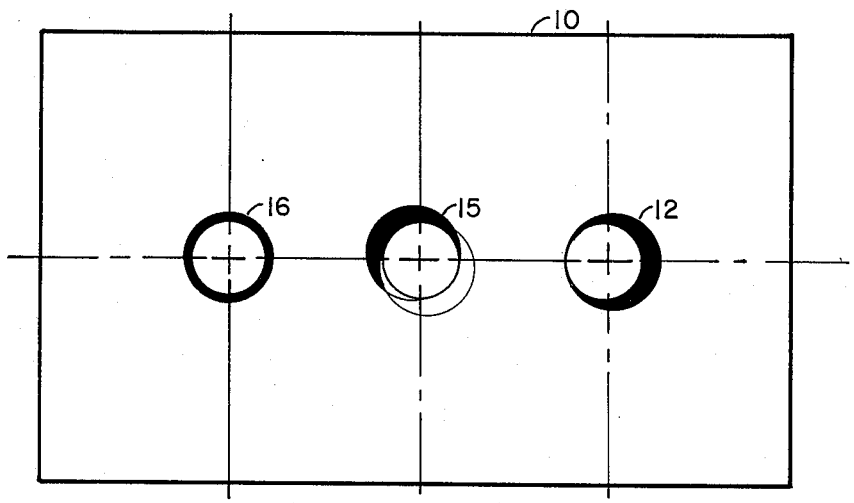
FIG. 5 is a top view of a plate having the dimensions of maximum material condition in accordance with the drawing of FIG. 3.

Similarly, the plate 10 of FIG. 5 is cut to its maximum material condition in accordance with the specification of FIG. 3. The maximum material condition demands that the holes be centered on their true position, but their borders should be shaded to indicate clearly that portion of material which could be removed and still meet the specification of FIG. 3. The shading should additionally indicate that the hole 16 must remain centered on its true position because its positional tolerance is zero at maximum material condition. The holes 12 and 15 may deviate from the true position in the prescribed manner.

Figure 6:
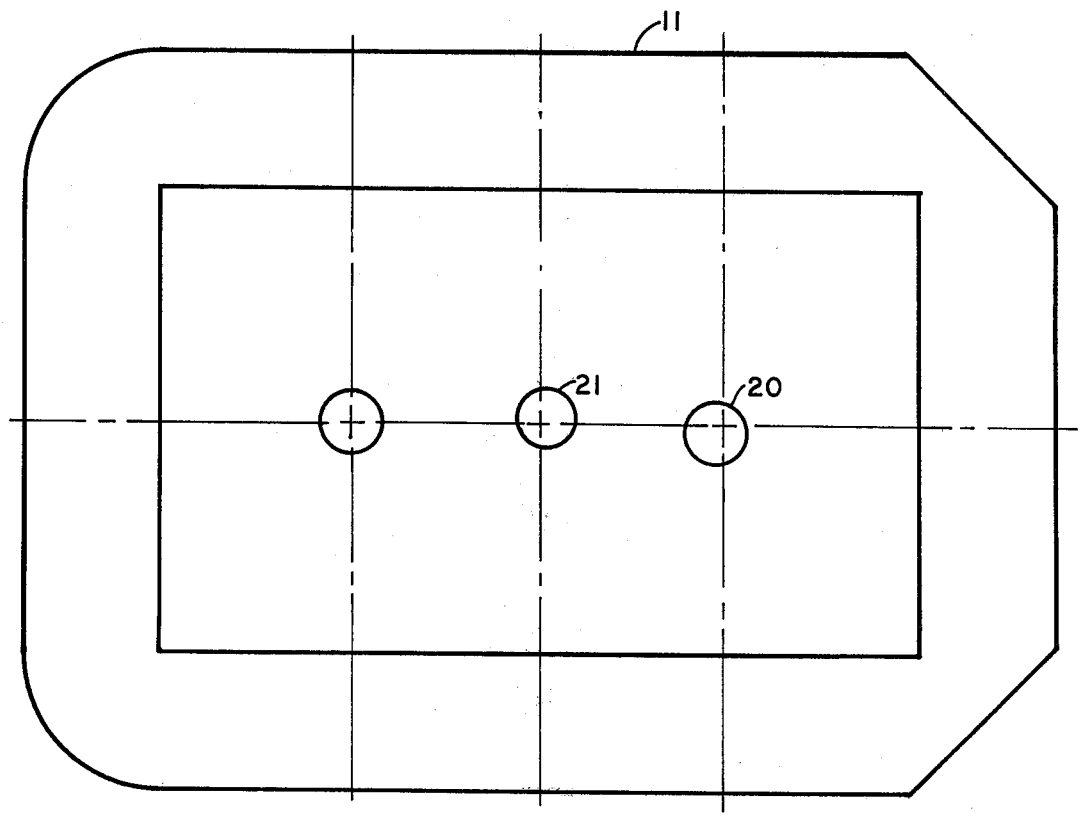
FIG. 6 is a top view of a frame having the dimensions of least material condition in accordance with the drawing of FIG. 2.
Figure 7:
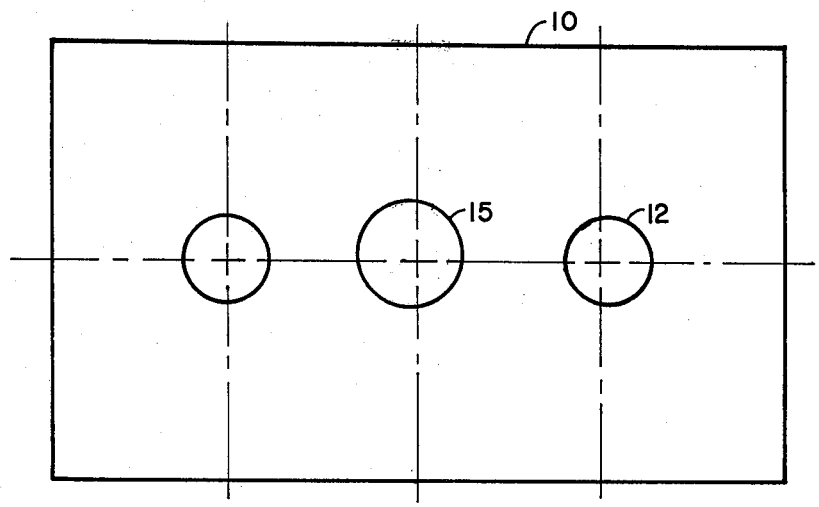
FIG. 7 is a top view of a plate having the dimensions of least material conditions in accordance with the drawing of FIG. 3.

FIGS. 6 and 7 show embodiments of the frame 11 and plate 10 respectively, cut to their least material condition in accordance with the specification of FIGS. 2 and 3. In the preferred embodiment, the pins 20 and 21 would be offset in some arbitrary direction to the maximum extent allowable by the specification, and the holes 12 and 15 would similarly be offset from their true position to the maximum extent allowable. The hole 16 and the pin 22 must remain centered on their true position at least material condition.

Figure 8:
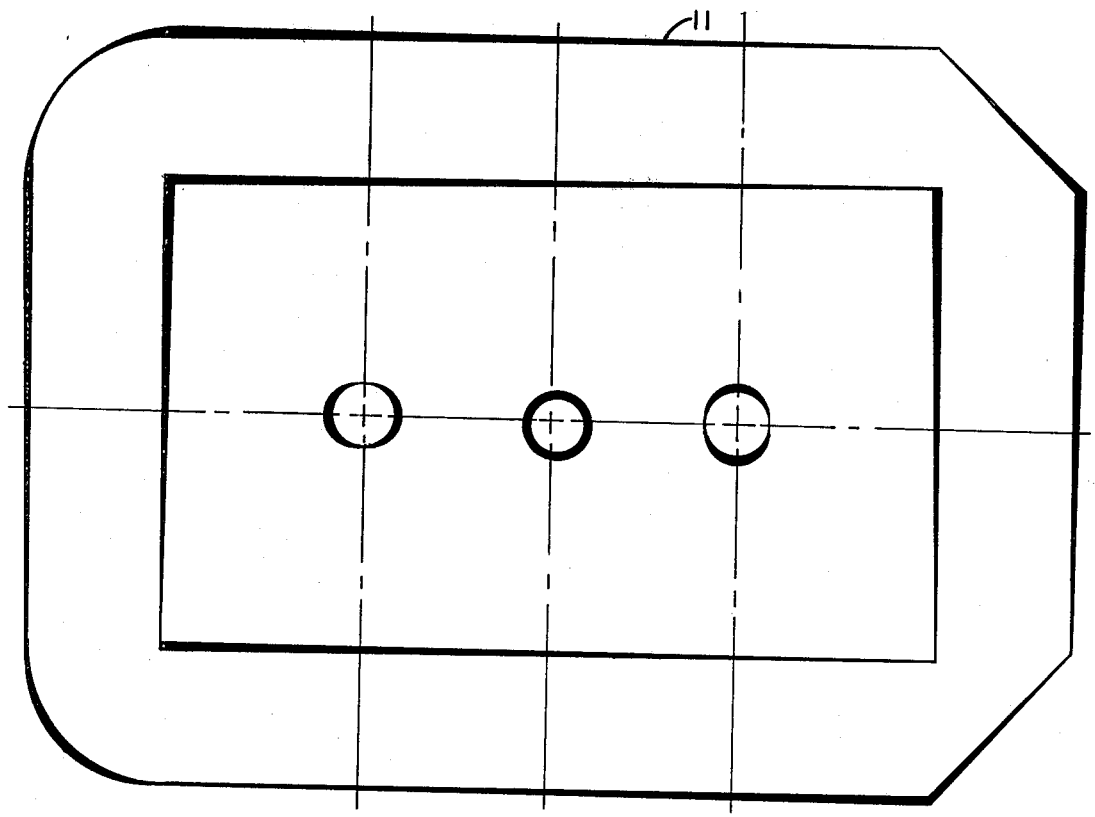
FIG. 8 is a top view of a frame having dimensions between least material condition and maximum material conditions in accordance with the drawing of FIG. 2.
Figure 9:
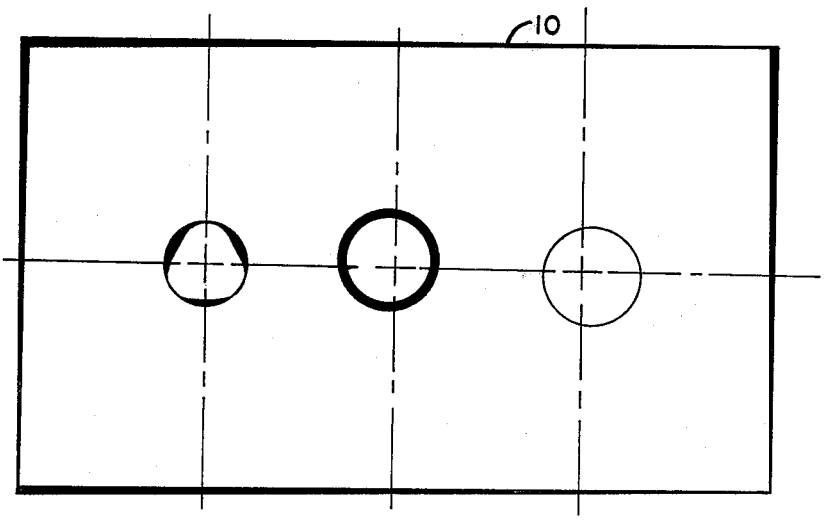
FIG. 9 is a top view of a plate having dimensions between least material condition and maximum material condition in accordance with the drawing of FIG. 3.

The FIGS. 8 and 9 show one of an indefinite number of possible variations of the frame 11 and the plate 10. They have features varying within the plate and frame contour limits and within the hole and pin size and position limits of the specification of FIGS. 2 and 3. While any of the possible shapes would serve adequately for purposes of instruction, a preferred embodiment would include some dimensions at the maximum material condition, some dimensions at the least material condition, and some dimensions within the two extremes. Any combination of size and position between the limits of FIG. 4 and FIG. 6 for the frame 11, and between FIG. 5 and FIG. 7 for the plate 10, is acceptable.

When using the apparatus as a teaching tool, an instructor might first describe in detail the meaning of the various dimensions shown in FIGS. 2 and 3. He might then pick up each of the pieces shown in FIGS. 4 – 9 in turn, describing and showing the relationship of each dimension of the apparatus to the related dimension of the drawing. In this manner, he could impart a clear understanding to the students of the terms "maximum material condition" and "least material condition" and their relationship to the specifications of the drawings.

The final step in aiding the student to visualize the concept embodied in the dimensions of FIGS. 2 and 3, might be in demonstrating the interconnectability and interchangeability of the various frames and plates of FIGS. 4 – 9. For example, the plate of FIG. 5 could be mated with the frame of FIG. 4 to demonstrate the closeness of the "perfect fit" condition embodied in the maximum material condition. The plate of FIG. 7 could be mated with the frame of FIG. 4 to demonstrate that a proper, though much looser, fit exists when a part having the dimensions of least material condition is mated with a part having the dimensions of maximum material condition. Finally the plate of FIG. 9 might be mated with the frame of FIG. 4 to demonstrate that, again, the proper fitting relationship is maintained, but with a degree of fitness less perfect than that of maximum material condition but better than that of least material condition.

Similarly, the plate of FIG. 5 could be mated with the frame of FIG. 6 to demonstrate that the parts do mate properly when one part has the dimensions of maximum material condition and its mating parts have the dimensions of least material condition. The plate of FIG. 7 could be mated with the frame of FIG. 6 to demonstrate the degree of fitness when both mating parts have the dimensions of least material condition. In this state it could be pointed out that the worst allowable fit exists.

The plate of FIG. 5 could then be mated with the frame of FIG. 8, demonstrating the mating relationship of a part having the dimensions of maximum material condition to a part having a specification between maximum material condition and least material condition. The plate of FIG. 7 could be mated with the frame of FIG. 8 to demonstrate how a part having the dimensions of least material condition can be fitted to a part having dimensions between maximum material condition and least material condition. Finally, the plate of FIG. 9 could be mated to the frame of FIG. 8, demonstrating the fitting relationship between parts, both of which have dimensions between the limits of maximum material condition and least material condition.

In the manner described herein above, it can be clearly demonstrated that parts made within the limits of a specification defined by true dimensioning and tolerancing will produce parts which will fit with mating parts, and will fit those parts within proper limits of tolerance. The apparatus demonstrates the extreme limits allowed by the specification, and demonstrates that any part within these extremes can be fitted to any mating part within the extremes.

The above description is of a preferred embodiment of a true dimensioning and tolerancing demonstrator, and the specific shape shown is not intended to be a limitation of the invention.

What is claimed is:

1. An apparatus for demonstrating the interconnectability and interchangeability of members having dimensions within maximum material condition and least material condition comprising:

at least three substantially similarly shaped embodiments of a first member, a first of said embodiments having the dimensions of maximum material condition, a second of said embodiments having the dimensions of least material condition, and the third of said embodiments having dimensions between maximum material condition and least material condition, and at least three substantially similarly shaped embodiments of a second member designed to interconnect with said first member, a first of said embodiments having the dimensions of maximum condition, a second of said embodiments having the dimensions of least material condition, and the third of said embodiments having dimensions between maximum material condition and least material condition.

2. The apparatus of claim 1 wherein the first member has a recessed opening into which the second member may be fitted.

3. The apparatus of claim 2 wherein the second member contains a hole and the first member contains a pin so placed as to mate with the hole when the second member is fitted into the recessed opening of the first member.

4. The apparatus of claim 3 wherein the first member carries a plurality of pins within the recessed area and the second member has a plurality of holes positioned in a mating relationship such that the pins fit within the holes when the second member is fitted into the recessed area of the first member.

* * * * *